United States Patent
Busayapongchai et al.

(10) Patent No.: US 6,944,594 B2
(45) Date of Patent: Sep. 13, 2005

(54) MULTI-CONTEXT CONVERSATIONAL ENVIRONMENT SYSTEM AND METHOD

(75) Inventors: Senis Busayapongchai, Tucker, GA (US); Pichet Chintrakulchai, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 506 days.

(21) Appl. No.: 09/870,202

(22) Filed: May 30, 2001

(65) Prior Publication Data

US 2002/0184023 A1 Dec. 5, 2002

(51) Int. Cl.$^7$ .............................................. G10L 21/00
(52) U.S. Cl. ..................... 704/275; 704/270; 704/270.1
(58) Field of Search .............................. 704/275, 270, 704/270.1, 251; 379/907, 917

(56) References Cited

U.S. PATENT DOCUMENTS

| | | | |
|---|---|---|---|
| 5,430,719 A | 7/1995 | Weisser, Jr. ................. 370/58.2 |
| 5,632,002 A | 5/1997 | Hashimoto et al. ........... 395/2.4 |
| 5,651,096 A * | 7/1997 | Pallakoff et al. ............. 704/275 |
| 5,699,486 A | 12/1997 | Tullis et al. ................ 395/2.79 |
| 5,699,534 A | 12/1997 | Barber et al. ................ 395/334 |
| 5,765,130 A * | 6/1998 | Nguyen ....................... 704/233 |
| 5,812,977 A * | 9/1998 | Douglas ...................... 704/275 |
| 5,897,618 A * | 4/1999 | Loats et al. .................. 704/275 |
| 6,081,774 A | 6/2000 | de Hita et al. .................. 704/9 |
| 6,125,347 A | 9/2000 | Cote et al. ................... 704/275 |
| 6,173,266 B1 | 1/2001 | Marx et al. .................. 704/270 |
| 6,182,046 B1 * | 1/2001 | Ortega et al. ................ 704/275 |
| 6,208,972 B1 * | 3/2001 | Grant et al. ................. 704/275 |
| 6,233,559 B1 * | 5/2001 | Balakrishnan .............. 704/275 |
| 6,505,162 B1 * | 1/2003 | Wang et al. ................. 704/275 |
| 6,603,836 B1 * | 8/2003 | Johnston .................. 379/88.16 |

OTHER PUBLICATIONS

Website Printout: http://www.sls.lcs.mit.edu/sls/whatwedo/index.html Spoken Language Systems, "What We Do" 3-page printout of Mar. 22, 2001 (Copyright 1998, Spoken Language Systems, Cambridge, MA).

* cited by examiner

Primary Examiner—David L. Ometz
Assistant Examiner—James S. Wozniak
(74) Attorney, Agent, or Firm—Woodcock Washburn LLP

(57) ABSTRACT

An interactive speech-activated information retrieval application for use in automated telephone systems includes a control manager that interfaces between the caller's speech input and applications and enables several applications to be open at the same time. The control manager continually monitors for control words, enabling the user to switch between applications at will. When a user switches to another application, the control manager suspends the first application and stores its context, enabling the user to later return to the application at the point where the application was previously suspended.

20 Claims, 6 Drawing Sheets

MULTI-CONTEXT CONVERSATIONAL ENVIRONMENT SYSTEM AND METHOD

FIELD OF THE INVENTION

The present invention relates in general to speech recognition and, more particularly, to interactive speech applications for use in automated telephone assistance systems.

BACKGROUND OF THE INVENTION

Computer-based interactive speech applications are widely used in telephone systems to answer incoming calls as well as to perform various tasks including gathering information from callers, providing information to callers, and connecting callers with appropriate parties. Typically, the call flow is activated when the system receives an incoming call, and begins with a system-generated greeting followed by a list of available options. The application waits for a response from the caller and processes the response when received. The application must be able to recognize what the caller said to determine what should happen next. It does this by converting the user's speech into a text sentence of distinct words (speech recognition), breaking down the recognized sentence grammatically and then systematically representing its meaning (language understanding), obtaining targeted data based on that meaning's representation from an appropriate online source (information retrieval), building a text sentence that presents the retrieved data in the user's preferred language (language generation), and converting that text sentence into computer-generated speech (speech synthesis).

Typically, interactive speech applications today are "single-threaded." If a user accesses an interactive speech-activated system to receive information, he would select one of the available options, complete the process and then return to the main menu to select a second option, if desired. If a user abandons the process before completion, the navigation through the system so far is lost and the user must start again at the top of the call flow. It would be helpful if a user were able to select an option, go partway through the call flow, decide to access another thread before proceeding with the first thread, suspend the first thread, select a second thread, and thereafter be able to return to the first thread at the point he left it. Hence a need exists for a multi-contextual speech application that overcomes the drawbacks of the prior art.

SUMMARY OF THE INVENTION

The present invention is directed to providing a multi-contextual speech application environment wherein several applications can be activated at the same time, thereby enabling the user to switch between applications at will while maintaining each application context. A control manager starts up applications, monitors speech for specific "control words" or "control phrases", and switches control among applications. Each application is independent of other applications, interacting with the control manager but not directly interacting with other applications, thereby leading to ease of development and maintenance because the first application does not need to be aware of the existence of other active applications.

The foregoing and other aspects of the present invention will become apparent from the following detailed description of the invention when considered in conjunction with the accompanying drawings.

DESCRIPTION OF EXEMPLARY EMBODIMENTS AND BEST MODE

Overview

Figure 1:
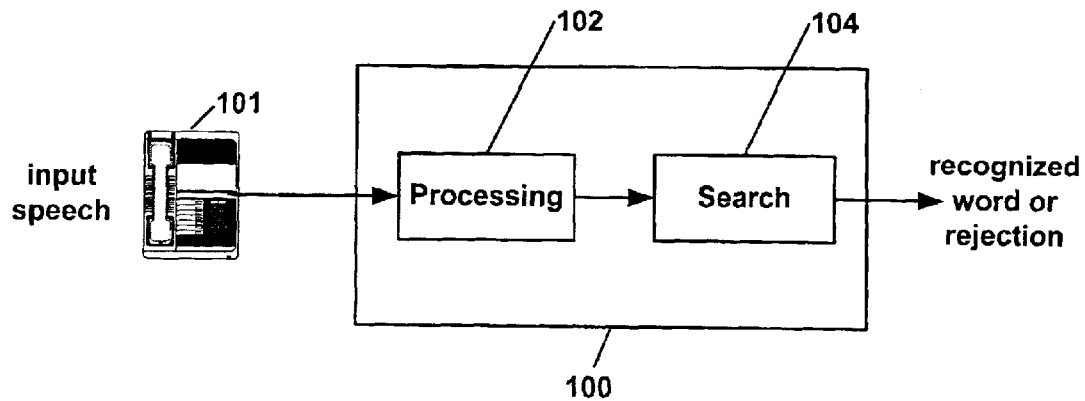
FIG. 1 shows a block diagram of a general speech recognition system.

Speech recognition systems have been developed in many parts of the world and, although it is difficult to describe a standard recognition system architecture, some characteristics are shared between many of them. A typical speech recognition system, of the type depicted in FIG. 1, generally comprises a device such as a microphone or telephone set 101 that converts a spoken utterance into an electric signal and transmits the signal to a speech recognition unit 100. The speech recognition unit 100 can be split into two functional blocks: a processing unit 102 and a search unit 104. The processing unit 102 is an acoustic processor that performs the segmentation, the normalization, and the parameterization of the input signal waveform. In some cases, especially for connected word speech, this stage may also include a feature extraction operation. The search unit 104 includes a speech recognition dictionary that is scored in order to find possible matches to the spoken utterance.

Figure 2:
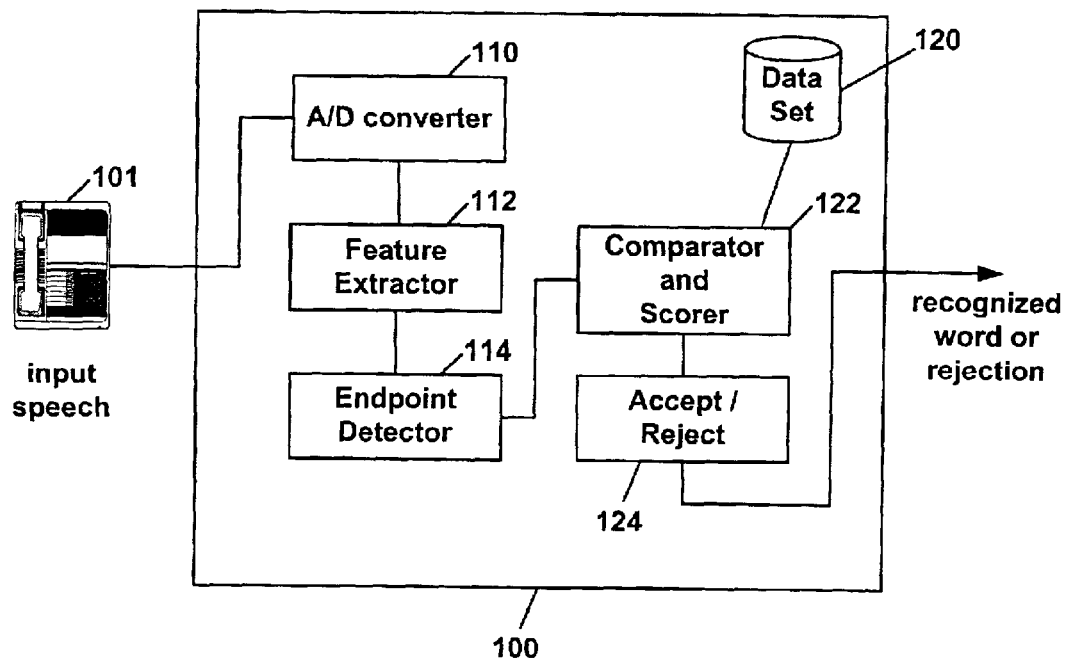
FIG. 2 shows a more detailed block diagram of the system of FIG. 1.

More specifically, the processing unit 102, illustrated in greater detail in FIG. 2, translates the incoming analog speech waveform into digital format. This can be done with the use of an A/D converter 110, a spectrogram generator or any other suitable device or technique. The input signal is then split into short segments called analysis frames whose typical duration ranges from about 5–20 ms. Further processing will be done relative to these frames. The processing unit 102 further comprises a feature extractor 112, which can comprise a normalizer and a parameterizer, and an endpoint detector 114.

The normalizer adjusts the maximum signal amplitude of each analysis frame to a standard level in order to take into account variations in speech intensity, transmission losses and other physical effects such as distance from the microphone and recording level. The parameterizer typically represents speech frames in terms of voicing decision, amplitude and fundamental frequency. A wide variety of parameters can be used in the parameterizer.

The endpoint detector 114 splits the input signal waveform into a starting point and an endpoint of the speech utterance. This stage uses algorithms whose purpose is to locate the boundaries between silence and speech. Many systems use the short term energy and the zero crossing rate as an indication of the beginning or end of a word. Moreover, typical endpoint detection units use many parameters including frame energy, frame voice labels and other statistical variance parameters derived from speech.

The search unit 104, shown in more detail in FIG. 2, scores or otherwise ranks all the words (also known as "orthographies") in a speech recognition dictionary database 120 such as to be able to derive the orthography or orthographies which have the highest probability of matching the spoken utterance. A comparator and scorer 122 compares the spoken utterance with the entries in the database 120 to determine a match based on closest score. Typical algorithms that can be used include the fast score estimation and the graph search algorithms, as known by those skilled in the art.

The accept/reject stage 124 compares the score to a predetermined threshold to determine if a correct mapping was found or if no mapping could be determined. If the score is greater than or equal to the predetermined threshold, then it is determined that a correct mapping has been found and the recognized word is provided as output, generally to another part of the system which may use the output as a link to information. If the score is below the threshold, no match is found and the input spoken utterance is rejected.

Figure 3:
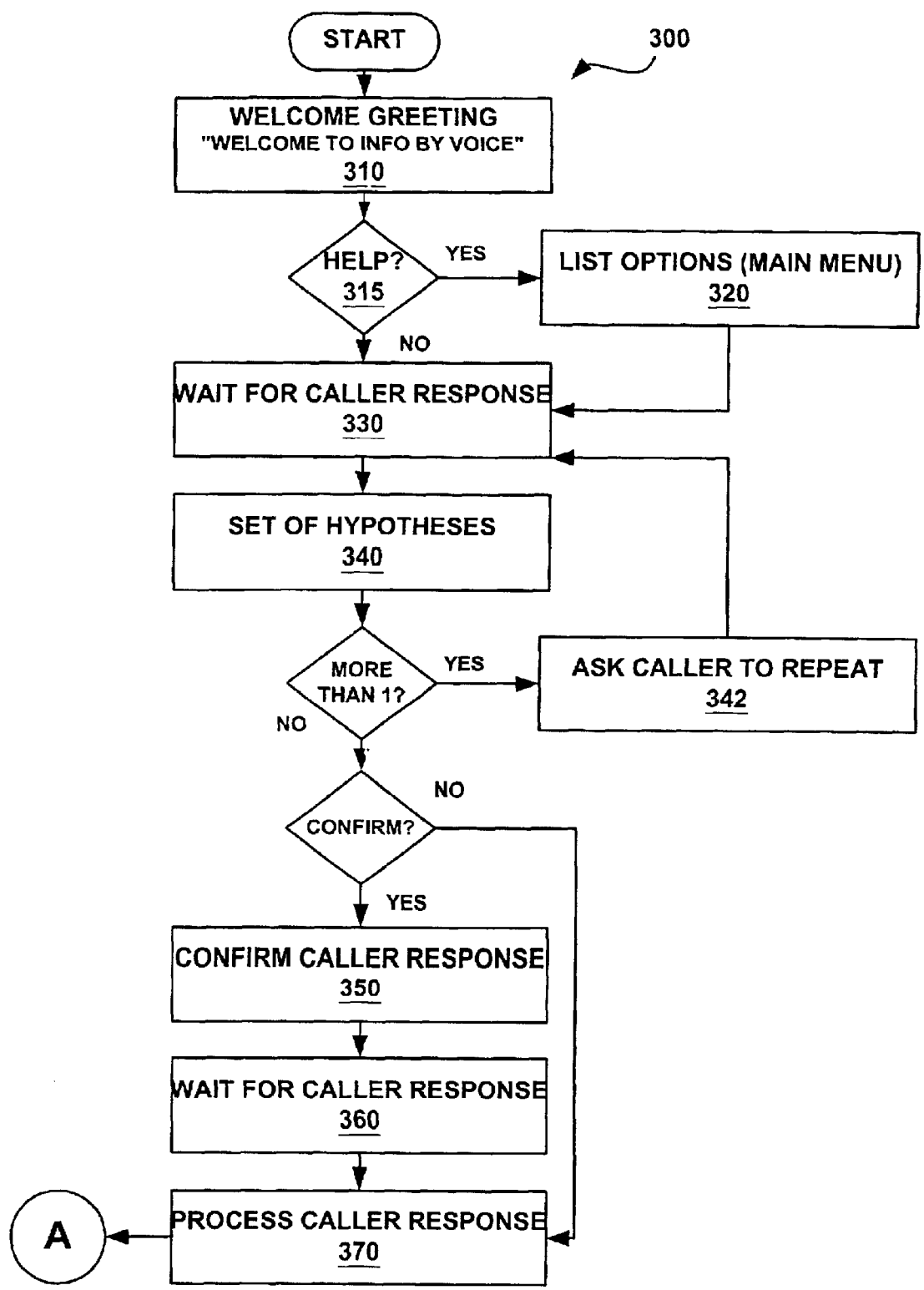
FIGS. 3 and 4 depict portions of an exemplary call flow as is well known in the art.
Figure 4:
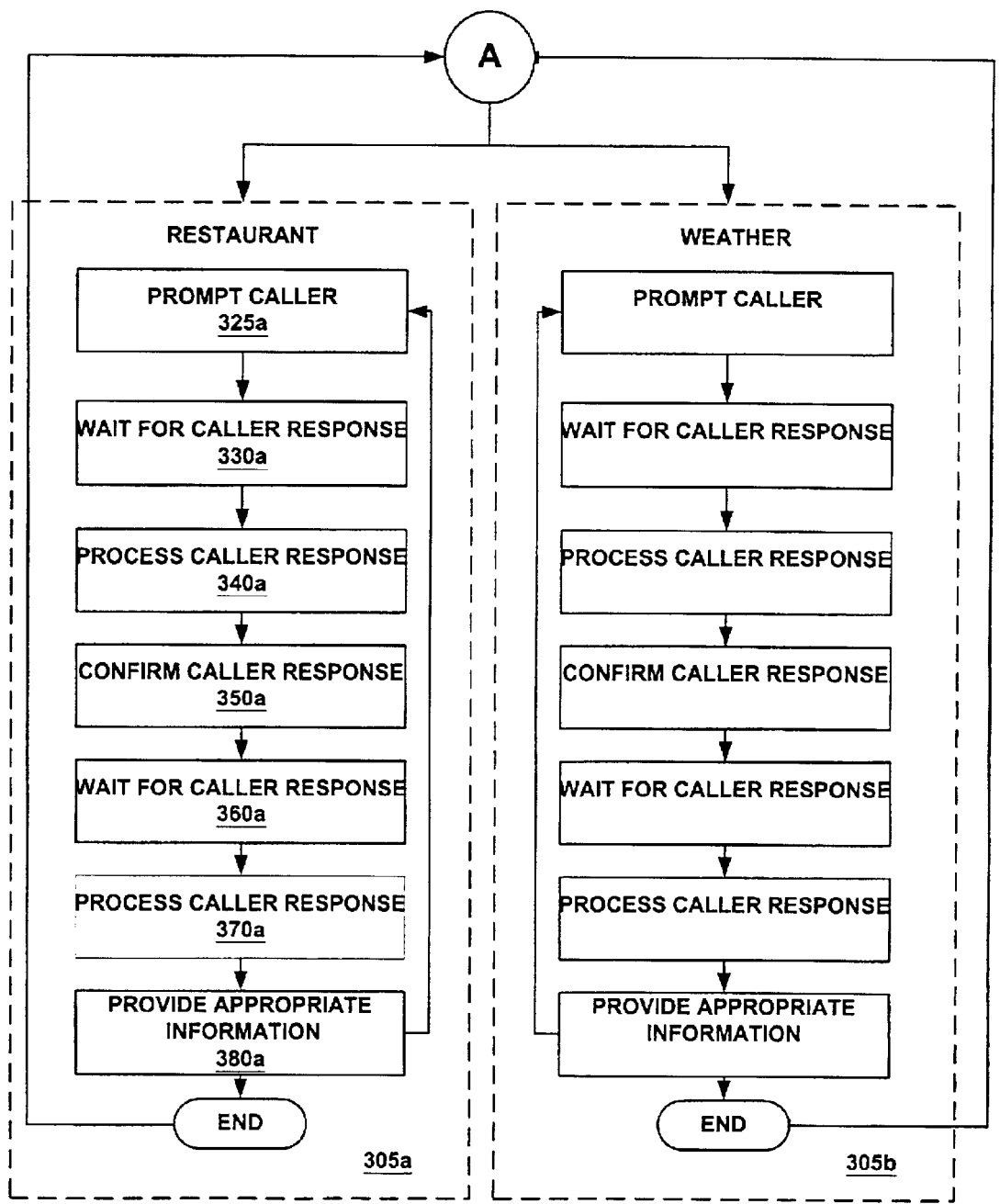

FIGS. 3 and 4 depict the call flow of an illustrative interactive speech application 300 as is presently known in the art, for use by a caller to obtain information. Application 300 may be executed by a voice processing unit in a telephone system. The call flow is activated when the system receives an incoming call, and begins by outputting a greeting at step 310, such as, "Welcome to Info by Voice for Atlanta. Please tell me the information category you want now or say 'Help' and I will explain your choices." In this example, the application outputs an audible speech signal to the caller by, for example, playing a pre-recorded prompt or using a speech generator such as text-to-speech converter to produce the message.

If the user responds, "Help" at step 315, the application then lists available options to the caller at step 320, by outputting a message such as, "Please listen carefully to the following eleven choices. Remember you can speak your request at any time: Restaurant Guides, Ticket Information, Stock Quotes, Weather Forecast, Business News, Sports, Daily Horoscopes, Lottery Results".

If the caller does not say "Help" at step 315 or after the options are listed at step 320, the system waits for a response from the caller at step 330. At step 340 the application determines one or more potential matches between the user's input and the available options, creating a set of hypotheses. If the caller says, for example, "Restaurants", the application must be able to recognize what the caller said and determine whether the caller's spoken input corresponds to one of the choices listed in the options. The application may determine that there are a plurality of potential matches between the caller's spoken input and the list of possible choices. At step 342, if there are a plurality of potential matches, the application asks the user to repeat his selection and processing returns to step 330, to wait for the caller's response.

If the set of hypotheses contains only one potential match but the score of the recognized string is lower than a predetermined confirmation threshold, at step 350 the application attempts to confirm the caller's response. Typically, the application will attempt to verify what the caller said, by asking, for example, "I think you said 'Restaurant'. Is that correct?"

At step 360, the application once again waits to receive a response from the caller. If the caller says "yes" and his response is understood by the application, processing continues at step 370. If the caller says "no" the caller will be re-prompted for input (not shown). When the caller's confirmation, ("Yes"), the application takes the appropriate steps to initiate the correct process at step 370, which in the given example is process 305a. This process repeats for each acceptable recognition result.

If the set of hypotheses contains only one potential match and the score of the recognized string is higher than the predetermined confirmation threshold, processing continues at step 370.

Referring now to FIG. 4, the application then prompts the caller for a response by outputting a message such as "Welcome to 'Restaurant'. Do you want to search by restaurant name or by type of food?" at step 325a. The system then waits for a response from the caller, at step 330a, and processes the response when received at step 340a. If the caller says, for example, "Type of food" the application must be able to recognize what the caller said and determine what information to provide. The application again attempts to verify what the caller said, at step 350a, by asking another question requiring a response, such as "I think you said 'Search by type of food'. Is that correct?" If the caller responds, at step 360a, "Yes", the speech application will then say, for example, "Tell me the type of food you want. You may also include the area of town or landmark you want." After this information is received from the caller (e.g., "Chinese restaurants in Midtown") at step 370a, the application lists the Chinese restaurants in Midtown at step 380a.

These types of conversational environments offered by current speech recognition applications allow a caller to interact using only a one-to-one dialog mode. For example, in order to obtain information about another topic, such as "Weather" in the example above and shown in process 305b, the caller must exit the "Restaurant" application and return to the main menu by saying "Main Menu", or go to the beginning of the weather service by saying "Weather". Processing then continues similar to that described above with respect to process 305a, but with a different set of prompts and information.

Additionally, whenever a request to switch to another topic option is received, processing for the first application terminates, and the call thread is lost. That is, if a caller who has navigated to "Chinese restaurants in Midtown" switches to "Weather" and then returns to "Restaurants", the caller will have to start again at the top, "Do you want to search by name of restaurant or by type of food?" rather than picking up at listing the Chinese restaurants in Midtown.

Multi-Context Conversational Environment

The present invention is directed to systems and methods for providing a multi-contextual speech application environment wherein several applications can be open at the same time, enabling a caller to switch between applications at will. A control manager interfaces with the caller, starts up applications, switches control among applications, alternately suspends and re-activates open applications, and maintains the context of suspended applications. Each application may be independent of other applications. Alternately the context may be transferred across applications. For example if a user who asked for "Chinese in Atlanta", then switched to weather, the system may ask the user if the user in interested in Atlanta weather. Additionally, the chance of recognizing "Atlanta" compared to other cities may be increased.

The present invention enables a caller to open multiple threads at the same time. For example, the present invention would enable a caller to navigate to "Chinese restaurants in Midtown," and then switch to "Weather," and then return to "Restaurants" and once again be at the point where the Chinese restaurants in Midtown would be listed. Moreover, any number of applications can be open at any time, limited by storage and other processing considerations. Such an environment helps simplify the application design because the application designer concentrates only on the designer's application. System users, however, may mix and match the functionalities of multiple applications according to the user's needs.

Figure 5:
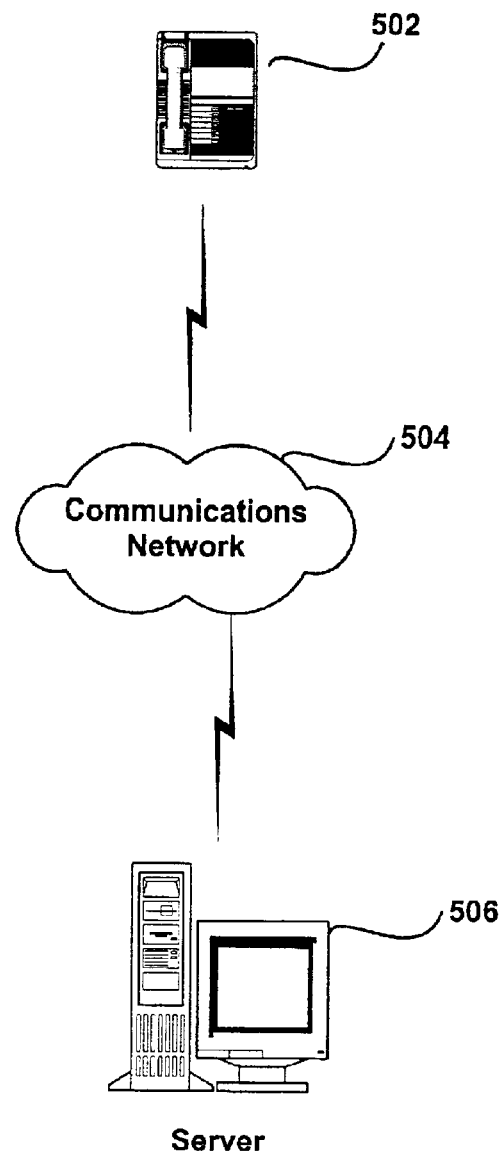
FIG. 5 shows a block diagram of an exemplary speech recognition system in accordance with the present invention.

FIG. 5 illustrates an exemplary environment in which the present invention may be deployed. As can be seen, a caller connects to a communications network 504 such as the publicly switched telephone network (PSTN) though a communications device 502 such as a telephone to receive audible information from a database of information stored on and processed by a server 506. Components of a typical server computer may include, but are not limited to, a processing unit, a system memory, a system bus that couples various system components including the system memory to the processing unit, storage media and various input and output devices.

The communications device 502 may include a subscriber telephone set that is connected via a telephone line (e.g., POTS, or similar) to a telephone system (e.g., communications network 504) including at least one central office switch, at least one service control point (SCP), and a service node (SN). This exemplary environment is a PSTN. It is contemplated that a portion of the PSTN may be part of the Advanced Intelligent Network (AIN) of a typical local exchange carrier. For further information regarding the referenced PSTN and AIN aspects thereof, the interested reader is referred to the patent to Weisser, U.S. Pat. No. 5,430,719, which is incorporated herein by reference. The SN typically can include voice and dual tone multi-frequency (DTMF) signal recognition devices and voice synthesis devices which can be used in accordance with the present invention.

Figure 6:
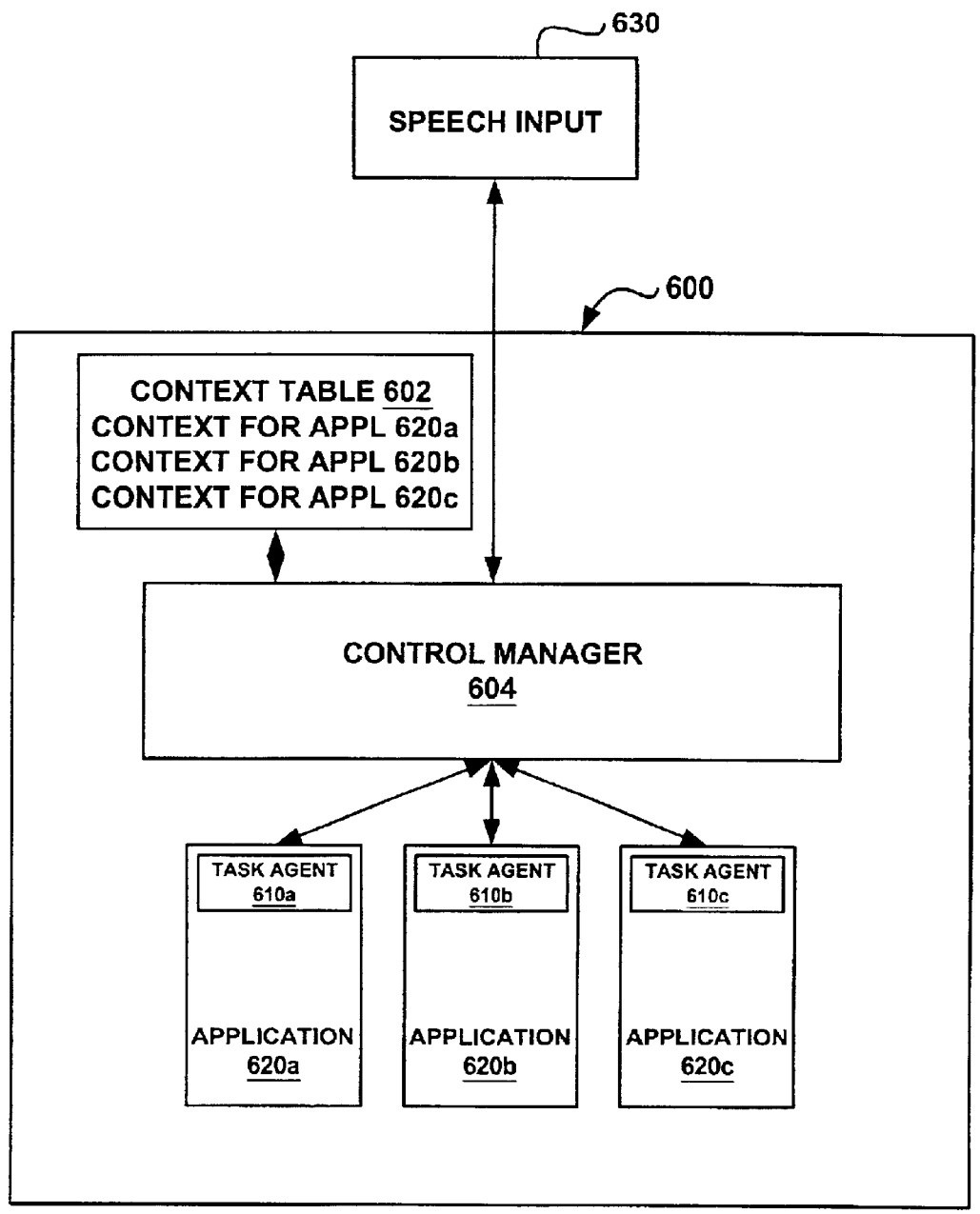
FIG. 6 shows a more detailed block diagram of an exemplary speech recognition system in accordance with the present invention.

FIG. 6 shows a more detailed block diagram of an exemplary speech recognition system in accordance with the present invention. The conversational operating environment 600 acts as a mediating agent between a caller's speech input 630 and the application software 620a, 620b, 620c through speech input and voice prompting output. Each open application 620a, 620b, 620c is assigned to a task agent, analogous to a window in the graphical world. Control manager 604 starts up applications, assigns a newly started application 620a, 620b, 620c to a task agent 610a, 610b, 610c, switches control among task agents 610a, 610b, 610c, maintains the context for each application in context table 602, and may transfers context across applications. The caller can call up control manager 604 at any time from any application 620a, 620b, 620c by speaking one of a list of control words or phrases. The caller interacts with the operating environment 600 and at any given time operating environment 600 directs the caller's speech input 630, when appropriate, to the currently active task agent 610a, 610b, 610c.

Because almost all of the processing for current over-the-telephone speech applications occur on the server side (the client is merely a telephone and has little or no processing power), the current environment states for a particular caller can persistently be saved and restored across sessions in context table 602 for each caller. According to one aspect of the invention, a caller may request to be reminded of the last context for an application 620a, 620b, 620c. Control manager 604 will output to the caller the context stored in context table 602 for the application 620a, 620b, 620c. Although three applications are described with respect to FIG. 6, it is contemplated that any number of applications can be implemented.

Figure 7:
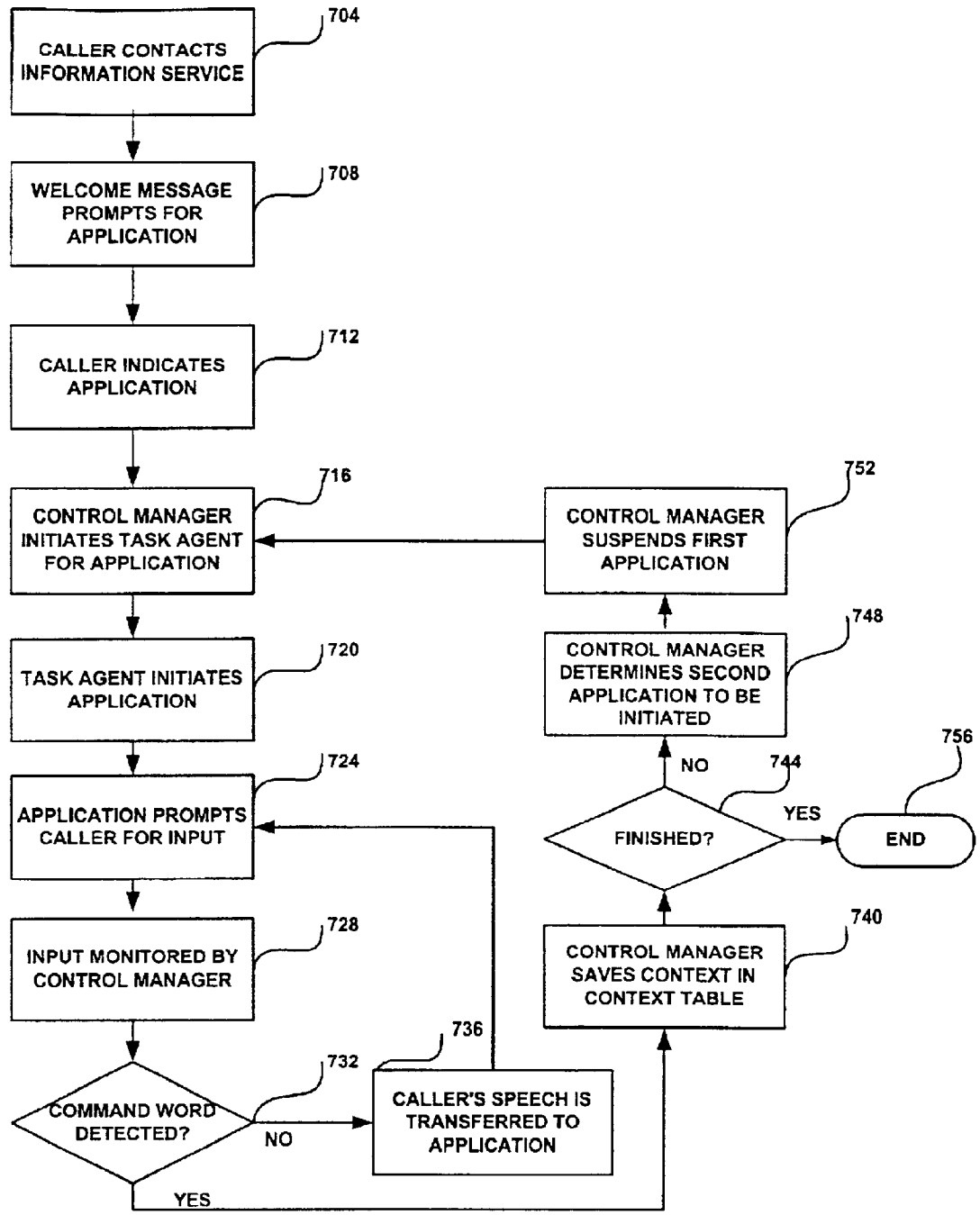
FIG. 7 shows a flow diagram of an exemplary method of speech recognition in accordance with the present invention.

FIG. 7 shows a flow diagram of an exemplary method of speech recognition in accordance with the present invention.

At step 704, a caller initiates a call to an information service in accordance with the present invention. At step 708, a welcome message is desirably played to the caller and the caller thereafter is prompted for the name of a desired service application (for example, a subject area such as "Weather", "Stock Quotes", etc.). At step 712, the caller indicates the desired application or subject area by speaking into the telephone handset, for example. The speech input is then processed/searched to determine the desired application. If the speech input does not correspond to an application, the user is prompted to repeat the speech input, for example, or the call may be forwarded to a human operator for assistance.

At step 716, the control manager initiates a task agent for the appropriate (user selected) application, as described above. The task agent then activates the application, at step 720. At step 724, the application prompts the caller for input through the control manager. The input is used by the application to narrow or limit the search (e.g., after choosing "Restaurants", the input may be for the type of restaurant or location, for example). At step 728, the input is received by the control manager and processed/searched to determine whether the input corresponds to available selections. If the speech input does not correspond to an application, the user is prompted to repeat the speech input, for example, or the call may be forwarded to a human operator for assistance.

The control manager monitors the input received and analyzes the input for the presence of command words, such as those that correspond to starting another application or subject area (e.g., "Main Menu", "Lottery Results", "Stock Quotes", etc.). At step 732, if no command words are found, the input is passed to the current speech application at step 736, which uses it in the current search or thread.

On the other hand, if at step 732 it is determined that the caller's input does contain a command word or words, the control manager saves the context of the currently open application in the context table at step 740. At step 744, the command word is compared to a list of words indicating that the caller wishes to terminate the call (e.g., "Goodbye", "End", etc.). If it is determined that the caller wishes to terminate the call, the system exits at step 756. If termination is not indicated, the command word is compared to a list of possible applications to determine the next application to be initiated, at step 748. If a valid service is found, the control manager suspends the first application at step 752 and initiates a task agent for the second application, with processing continuing at step 716. At least one indicator is stored that indicates the current processing step of the initial application. In this manner, the caller can return to the application at the point where it was suspended when the second application was opened. Preferably, the at least one indicator comprises a series of indicators that indicate a processing path of the first application. Moreover, desirably, a computer generated representation of the series of indicators is stored (for future use or analysis) that indicates the processing path of the first application.

As an example, assume that a caller initiates a call to a telephone information service in accordance with the present invention in which the information provided includes weather, airline reservations and hotel reservations. The caller may indicate "Airline reservation" when prompted for his choice of application, and navigate to the point where he will receive information concerning the cost of a flight from Atlanta to Philadelphia on August 4. At this point the caller may say "Hotel" to indicate that he wishes to receive information concerning hotel reservations. After determining the cost or availability of hotel reservations in Philadelphia, the caller could indicate his desire to return to the "Airline Reservation" application by saying "Airline" and would be returned to the point at which he suspended the "Airline Reservation" application to inquire about hotel reservations. Although in this example only two contexts are illustrated, it should be understood that any number of threads or applications could be active at the same time, limited only by the capacity of the context table.

It is contemplated that each application can provide the audible information to the caller in an associated voice, so that different voices are used for different applications. In this manner, a caller will hear distinguishable voices providing information for the various applications.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A method of speech recognition processing that provides audible information over a communications device comprising:
    receiving a first speech input at a network server, said first speech input associated with a caller menu system and indicative of a first subject area;
    initiating a first subject application associated with said first subject area;
    receiving a second speech input at the network server, said second speech input associated with the caller menu system, said second speech input indicative of a second subject area associated with a second independent application;
    storing at least one indicator indicating a current processing step of said first subject application; and
    storing a current context associated with said first speech input associated with said first subject application in a context table and audibly outputting said current context upon a user request.

2. The method according to claim 1, further comprising initiating said second subject application associated with said second subject area.

3. The method according to claim 1, further comprising initiating a task agent for said first subject application.

4. The method according to claim 1, further comprising monitoring said first speech input for at least one word indicative of said second subject area.

5. The method according to claim 1, further comprising suspending said first subject application after receiving said second speech input.

6. The method according to claim 5, further comprising:
    receiving a further speech input, and re-activating said first subject application responsive to the further speech input.

7. The method according to claim 1, wherein said storing at least one indicator further comprises storing a series of indicators that indicate a processing path of said first application.

8. The method according to claim 7, further comprising outputting a computer-generated representation of said stored series of indicators that indicates said processing path of said first application.

9. The method according to claim 1, further comprising outputting information associated with said first application in a first voice.

10. The method according to claim 9, further comprising outputting information associated with a second application in a second voice, said second voice being distinguishable from said first voice.

11. The method according to claim 1, further comprising synthesizing speech for outputting speech from said first application.

12. A speech recognition system comprising:
    a speech recognition module located at a network server that processes speech input and translates said speech input into computer-readable input;
    a control manager comprising:
    a module that interfaces between said speech input and at least one of a plurality of caller menu application programs;
    a module that initiates processing of a first application program; and
    a module that monitors said speech input for a request to initiate a second independent application program;
    a module that stores a current context of said first application program in a context table and audibly outputs said current context upon a user request; and
    a speech synthesizing module for providing output information from said plurality of application programs.

13. The system according to claim 12, wherein the context table maintains a first current context for said first application program and a second current context for said second application.

14. The system according to claim 12, further comprising a plurality of task agents, each task agent associated with one of said plurality of application programs.

15. The system according to claim 14, wherein the control manager is adapted to assign said application programs to said task agents, and switch control among said task agents.

16. The system according to claim 12, wherein the request comprises a control word.

17. The system according to claim 12, wherein the control manager is adapted to suspend said first application program, and initiate processing of said second application program, responsive to the request.

18. The system according to claim 17, wherein the control manager is adapted to re-activate said first application program responsive to a further request.

19. The system according to claim 12, wherein the control manager is adapted to store at least one indicator indicative of a current processing step of at least one of said plurality of application programs.

20. A computer-readable medium for storing computer-executable instructions for:
    receiving a first speech input at a network server, said first speech input associated with a caller menu system and indicative of a first subject area;
    initiating a first subject application associated with said first subject area;
    receiving a second speech input at the network server, said second speech input associated with the caller menu system, said second speech input indicative of a second subject area associated with a second independent application;
    storing at least one indicator indicating a current processing step of said first subject application; and
    storing a current context associated with said first speech input associated with said first subject application in a context table and audibly outputting said current context upon a user request.

* * * * *